United States Patent
Liu et al.

(10) Patent No.: US 11,388,711 B2
(45) Date of Patent: Jul. 12, 2022

(54) TRANSMISSION METHOD AND DEVICE, COMPUTER READABLE STORAGE MEDIUM

(71) Applicant: ZTE CORPORATION, Guangdong (CN)

(72) Inventors: Kun Liu, Shenzhen (CN); Bo Dai, Shenzhen (CN); Huiying Fang, Shenzhen (CN); Weiwei Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/022,689

(22) Filed: Sep. 16, 2020

(65) Prior Publication Data

US 2020/0413389 A1 Dec. 31, 2020

Related U.S. Application Data

(63) Continuation of application No. PCT/CN2019/081333, filed on Apr. 3, 2019.

(30) Foreign Application Priority Data

Apr. 4, 2018 (CN) .......................... 201810300467.6

(51) Int. Cl.
*H04W 72/04* (2009.01)
*H04W 4/70* (2018.01)
(Continued)

(52) U.S. Cl.
CPC .......... *H04W 72/044* (2013.01); *G16Y 10/75* (2020.01); *H04L 1/1812* (2013.01); *H04W 4/70* (2018.02); *H04W 74/0825* (2013.01); *H04W 84/042* (2013.01)

(58) Field of Classification Search
CPC . H04W 72/042; H04W 4/70; H04W 72/0446; H04W 88/02; H04W 72/0413; H04W 72/048; H04W 28/02
See application file for complete search history.

(56) References Cited

U.S. PATENT DOCUMENTS

2011/0085508 A1* 4/2011 Wengerter ............ H04L 5/0094
375/295
2015/0043526 A1* 2/2015 Wang .................... H04L 1/0009
370/330

(Continued)

FOREIGN PATENT DOCUMENTS

| CN | 106559898 A | 4/2017 |
|---|---|---|
| CN | 106685587 A | 5/2017 |
| WO | WO-2014/146276 A1 | 9/2014 |

OTHER PUBLICATIONS

Netmanias, "NB-IoT—Data Rates and Latency" (Year: 2017).*

(Continued)

*Primary Examiner* — Dung Hong
(74) *Attorney, Agent, or Firm* — Foley & Lardner LLP (57) ABSTRACT

Provided are a transmission method and device, and a computer readable storage medium. The transmission method includes: receiving, by a terminal, indication information of a maximum transmission block size (TBS) supported by a data transmission, and determining the maximum TBS supported by the data transmission according to the indication information; and determining, by the terminal, a TBS supported by the data transmission according to the maximum TBS supported by the data transmission.

16 Claims, 4 Drawing Sheets

1010

A terminal receives indication information of a maximum transmission block size (TBS) supported by a data transmission, and determines the maximum TBS supported by the data transmission according to the indication information

1020

The terminal determines a TBS supported by the data transmission according to the maximum TBS supported by the data transmission (51) Int. Cl.
*G16Y 10/75* (2020.01)
*H04L 1/18* (2006.01)
*H04W 74/08* (2009.01)
*H04W 84/04* (2009.01)

(56) References Cited

U.S. PATENT DOCUMENTS

| | | | | |
|---|---|---|---|---|
| 2015/0085729 | A1* | 3/2015 | Majjigi | H04W 52/367 |
| | | | | 370/311 |
| 2017/0135098 | A1* | 5/2017 | Kang | H04W 4/70 |
| 2019/0215872 | A1* | 7/2019 | Park | H04W 74/0833 |
| 2019/0229836 | A1* | 7/2019 | Perotti | H04L 1/0006 |
| 2020/0112418 | A1* | 4/2020 | Kwon | H04L 5/0055 |

OTHER PUBLICATIONS

Extended European Search Report on EP 19780933.8 dated Feb. 25, 2021 (6 pages).
Huawei et al.: "Correction on TBS values", 3GPP TSG RAN WG1 Meeting #88bis, RI-1705150, Spokane, WA, Apr. 3-7, 2017 (3 pages).
Mediatek Inc: "Early Data Transmission TBS Determination," 3GPP TSG RAN WG1 Meeting #92bis, RI-1804143, Sanya, China, Apr. 16-20, 2018 (4 pages).
Huawei et al.: "Early Data Transmission in RACH for NB-IoT", 3GPP TSG RAN WGJ Meeting #92 R1-1801438, Mar. 2, 2018 (Mar. 2, 2018),Athens, Greece (4 pages).
International Search Report for PCT Appl. No. PCT/CN2019/081333 dated Jul. 4, 2019 (with English translation, 5 pages).
First Office Action on KR 10-2020-7027221 dated Aug. 10, 2021 (13 pages, including English translation).
MediaTek Inc., "On NB-IoT EDT indication via PRACH", 3GPP TSG RAN WG1 Meeting #91, R1-1719592, Reno, Nevada, Nov. 27-Dec. 1, 2017 (5 pages).
First Examination Report on IN appl. No. 202027040558, dated Feb. 3, 2022 (8 pages).

* cited by examiner

TRANSMISSION METHOD AND DEVICE, COMPUTER READABLE STORAGE MEDIUM

CROSS-REFERENCE TO RELATED APPLICATIONS

This application claims the benefit of priority under 35 U.S.C. § 120 as a continuation of PCT Patent Application No. PCT/CN2019/081333, filed on Apr. 3, 2019, which claims priority to Chinese Patent Application No. 201810300467.6 filed on Apr. 4, 2018, the disclosure of each of which is incorporated herein by reference in its entirety.

TECHNICAL FIELD

The present disclosure relates to communication technologies, for example, to a transmission method and device, and a computer readable storage medium.

BACKGROUND

With developments of smart terminals and enrichments of wireless data application services, data users in a wireless communication network have increased greatly and wireless data contents are no longer limited to traditional texts or images, more and more multimedia services such as high-definition videos and mobile televisions are emerging, which results in an explosive growth of wireless communication network traffics. Services of the mobile Internet and the Internet of Things will become a main driving force for mobile communication developments.

For the Internet of Things, the 3rd generation partnership project (3GPP) standard organization has developed two representative communication standard protocols: the machine type communication (MTC) and the narrow band Internet of Things (NB-IoT).

In communication protocols in the related art, a user equipment (UE) may send data to a base station or receive data sent by the base station only after the UE completes related flows and operations for accessing a system. To achieve an earlier data transmission between the UE and a base station, an early data transmission (EDT) technology is introduced into the protocols, which allows the UE to transmit data to the base station during the related process of accessing the system. However, there is a lack of a related scheme for implementing an EDT.

SUMMARY

At least one embodiment of the present disclosure provides a transmission method and device, and a computer readable storage medium, so as to determine a transmission block size (TBS) supported by a data transmission according to a maximum TBS, so that a base station allocates a resource for a terminal to perform the data transmission.

At least one embodiment of the present disclosure provides a transmission method. The transmission method includes steps described below.

A terminal receives indication information of a maximum TBS supported by a data transmission, and determines the maximum TBS supported by the data transmission according to the indication information.

The terminal determines a TBS supported by the data transmission according to the maximum TBS supported by the data transmission.

An embodiment of the present disclosure provides a transmission device. The transmission device includes a memory and a processor, where the memory stores a program which, when read and executed by the processor, implements the transmission method according to any embodiment.

An embodiment of the present disclosure provides a computer readable storage medium. The computer readable storage medium stores at least one program executable by at least one processor to implement the transmission method according to any embodiment.

Compared with the related art, the embodiments of the present disclosure determine the TBS supported by a transmission according to the maximum TBS, so that the base station allocates the resource for the terminal to perform the data transmission.

DETAILED DESCRIPTION

The embodiments of the present disclosure will be described hereinafter in conjunction with the drawings.

The steps illustrated in the flowcharts among the drawings may be performed by a computer system such as a group of computers capable of executing instructions.

In a related wireless communication protocol, for example, an NB-IoT protocol, a random access process includes at least following procedures: an NB-IoT terminal (UE) sends a random access signal (also referred to as a Msg1) on a narrow band physical random access channel (NPRACH) in an NB-IoT system; and after receiving the Msg1, a base station sends a random access response (RAR) (also referred to as a message 2 (Msg2)) to the UE.

The UE receives the Msg2 to obtain uplink time synchronization and uplink resources. However, it cannot be determined at this time that the Msg2 is sent to the UE itself rather than another UE, because there is a possibility that different UEs send a same random access sequence on a same time-frequency resource, so that these UEs receive the same Msg2 through a same random access radio network temporary identifier (RA-RNTI). Furthermore, the UE does not know whether another UE is performing a random access using a same resource. Thus, the UE needs to resolve a random access collision through subsequent message 3 (Msg3) and message 4 (Msg4), where the Msg3 is also referred to as a collision detection message, and the Msg4 is also referred to as a collision detection response message.

The Msg3 is a first message sent based on an uplink scheduling and over a narrow band physical uplink shared channel (NPUSCH) by using the hybrid automatic repeat request (HARQ) mechanism. In an initial random access process, a radio resource control (RRC) connection request is sent in the Msg3. If different UEs receive a same RAR, the different UEs obtain a same uplink resource and simultaneously send the Msg3, in order to distinguish the different UEs, a UE-specific identifier (ID) is carried in the Msg3 to distinguish the different UEs. In the case of the initial access, this ID may be a serving-temporary mobile subscriber identity (S-TMSI) of the UE or a randomly generated 40-bit value.

The UE starts a contention resolution timer immediately after it sends the Msg3 (and then restarts the timer every time the Msg3 is re-sent), and the UE needs to listen for the collision detection (contention resolution) response message (the Msg4) returned to itself by the base station within the time period of the timer.

In a wireless communication protocol, the UE may send data to the base station or receive data sent by the base station only after it completes the random access process and accesses the system. To achieve an earlier data transmission between the UE and the base station, an EDT is introduced in the wireless communication protocol, which allows the UE to transmit data to the base station during the random access process. During an EDT process, since the base station does not know a size of a data block to be sent by the UE, the base station cannot allocate a resource for the data transmission to the UE during the EDT process. Therefore, it is necessary to provide a transmission method, so that the terminal and the base station can determine a TBS supported by the EDT.

Figure 1:
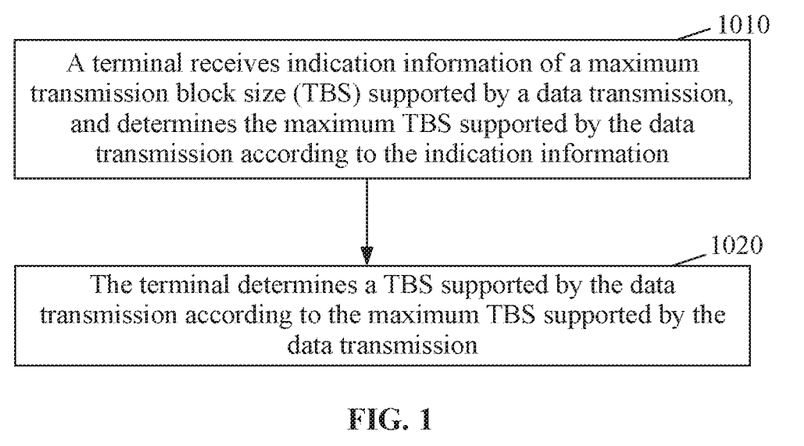
FIG. 1 is a flowchart of a transmission method according to an embodiment of the present disclosure.

FIG. 1 is a flowchart of a transmission method according to an embodiment of the present disclosure. As shown in FIG. 1, the method according to this embodiment includes step 1010 and step 1020.

In step 1010, a terminal receives indication information of a maximum TBS supported by a data transmission, and determines the maximum TBS supported by the data transmission according to the indication information.

In step 1020, the terminal determines a TBS supported by the data transmission according to the maximum TBS supported by the data transmission.

In an embodiment, the data transmission is, for example, an EDT or a data transmission performed through a Msg3 in a random access process.

A number of TBSs supported by the data transmission is greater than or equal to 1, that is, the TBS supported by the data transmission is at least one TBS.

The method according to this embodiment enables the terminal to determine the TBS supported by the data transmission, so that a base station allocates a resource for the terminal to perform the data transmission.

In an embodiment, the indication information is sent to the terminal through system information (SI), and the terminal acquires the indication information from the SI. When a system supports multiple coverage enhancement levels, a maximum TBS supported by the data transmission may be configured for each coverage enhancement level.

In an embodiment, the maximum TBS supported by the data transmission is selected from a first TBS set. The indication information is, for example, index information, and the terminal acquires the maximum TBS supported by the data transmission from the first TBS set according to the index information.

The step 1010 in which the maximum TBS supported by the data transmission is determined according to the indication information includes that when the indication information is the index information, the terminal searches the first TBS set according to the index information to determine the maximum TBS supported by the data transmission.

In this embodiment, the first TBS set includes at least one TBS. The first TBS set is pre-configured or sent by the base station to the terminal.

In an embodiment, the first TBS set includes 8 TBSs and is one of: {328, 408, 504, 600, 712, 808, 936, 1000}, {328, 408, 504, 616, 712, 808, 936, 1000}, {328, 408, 536, 600, 712, 808, 936, 1000}, {328, 408, 536, 616, 712, 808, 936, 1000}, {328, 424, 504, 600, 712, 808, 936, 1000}, {328, 424, 504, 616, 712, 808, 936, 1000}, {328, 424, 536, 600, 712, 808, 936, 1000}, {328, 424, 536, 616, 712, 808, 936, 1000}, {296, 392, 472, 584, 680, 776, 872, 1000}, or {328, 408, 488, 584, 680, 776, 840, 936}.

In this embodiment, the TBS has a unit of bits. In this embodiment, the TBSs included in the first TBS set are only examples. The first TBS set may include more TBSs or include other TBSs as needed, which is not limited in the embodiments of the present disclosure.

Scheme one: starting with the maximum TBS supported by the data transmission, multiple TBSs are sequentially taken from the first TBS set as the TBS supported by the data transmission.

In an embodiment, the step in which the TBS supported by the data transmission is determined according to the maximum TBS supported by the data transmission includes steps described below. When a number of TBSs less than or equal to the maximum TBS in the first TBS set is greater than or equal to N, N TBSs of the TBSs less than or equal to the maximum TBS in the first TBS set are served as the TBS supported by the data transmission, where N is greater than or equal to 1.

In an embodiment, the step in which the N TBSs of the TBSs less than or equal to the maximum TBS in the first TBS set are served as the TBS supported by the data transmission includes a step described below. Largest or smallest N TBSs of the TBSs less than or equal to the maximum TBS in the first TBS set are served as the TBS supported by the data transmission. For example, the TBSs less than or equal to the maximum TBS in the first TBS set are sorted in a value order, and first N TBSs or last N TBSs are taken as the TBS supported by the data transmission. For example, the TBSs less than or equal to the maximum TBS in the first TBS set are sorted in a descending order, and the first N TBSs or the last N TBSs are taken; or the TBSs less than or equal to the maximum TBS in the first TBS set are sorted in an ascending order, and the first N TBSs or the last N TBSs are taken.

In an embodiment, for example, N is 4. Of course, it is only an example, and N may have other values as needed. N may be pre-configured or sent by the base station to the terminal. In an example in which the first TBS set is {328, 408, 504, 600, 712, 808, 936, 1000}, when the maximum TBS supported by the data transmission is 712, and N=4, starting with 712, 4 TBSs less than or equal to 712 in the first TBS set are taken as the TBS supported by the data transmission, i.e., {408, 504, 600, 712}. The value of N may be predefined or sent by the base station to the terminal. When the value of N is sent by the base station to the terminal, in an embodiment, it is sent to the terminal through a Msg2. In an embodiment, 4 values of N are indicated through 2 bits, for example, N may be selected from {1, 2, 3, 4}.

In another embodiment, the step in which the TBS supported by the data transmission is determined according to the maximum TBS supported by the data transmission includes steps described below. When the number of TBSs less than or equal to the maximum TBS in the pre-configured first TBS set is less than N, the TBSs less than or equal to the maximum TBS in the first TBS set are served as the TBS supported by the data transmission, where N is greater than or equal to 1. In an embodiment, for example, N is 4. Of course, it is only an example, and N may have other values as needed. In an example in which the first TBS set is {328, 408, 504, 600, 712, 808, 936, 1000}, when the maximum TBS supported by the data transmission is 504, and N=4, since only 3 TBSs are less than or equal to 504 in the first TBS set, starting with 504, the 3 TBSs less than or equal to 504 are taken as the TBS supported by the data transmission, i.e., {328, 408, 504}. The value of N may be predefined or sent by the base station to the terminal. When the value of N is sent by the base station to the terminal, in an embodiment, it may be sent to the terminal through a Msg2. In an embodiment, 4 values of N are indicated through 2 bits, for example, N may be selected from {1, 2, 3, 4}. The value of N in subsequent embodiments is similar to the value of N here, which will not be repeated.

Scheme two: multiple TBSs are directly selected in order, and the selected multiple TBSs have same intervals between each other.

In an embodiment, the step in which the TBS supported by the data transmission is determined according to the maximum TBS supported by the data transmission includes steps described below. TBSs in the first TBS set are sorted in order, and all TBSs distributed at first intervals from a maximum TBS among TBSs less than or equal to the maximum TBS in the first TBS set are served as the TBS supported by the data transmission or a subset of the all TBSs distributed at the first intervals is served as the TBS supported by the data transmission. For example, the first interval is 1, then starting with the maximum TBS supported by the data transmission, one TBS is taken every other TBS from the first TBS set as the TBS supported by the data transmission; or starting with the maximum TBS supported by the data transmission, one TBS is taken every other TBS from the first TBS set to form a set and a subset of the set is taken as the TBS supported by the data transmission. In an example in which the first TBS set is {328, 408, 504, 600, 712, 808, 936, 1000}, when the maximum TBS supported by the data transmission is 1000, one TBS is taken every other TBS to obtain a following TBS set: {408, 600, 808, 1000}, and TBSs in this TBS set are served as the TBS supported by the data transmission. If one TBS is taken every other two TBSs, a following TBS set is obtained: {408, 712, 1000}, and TBSs in this TBS set are served as the TBS supported by the data transmission. In this embodiment, the first interval may be predefined or sent by the base station to the terminal. The first interval is a position interval.

In an embodiment, the step in which the all TBSs distributed at the first intervals from the maximum TBS among the TBSs less than or equal to the maximum TBS in the first TBS set are served as the TBS supported by the data transmission or the subset of the all TBSs distributed at first intervals is served as the TBS supported by the data transmission includes steps described below. When a number of the all TBSs distributed at the first intervals from the maximum TBS among the TBSs less than or equal to the maximum TBS in the first TBS set is greater than or equal to N, N TBSs of the all TBSs distributed at the first intervals from the maximum TBS among the TBSs less than or equal to the maximum TBS in the first TBS set are served as the TBS supported by the data transmission. The N TBSs may be first N TBSs or last TBSs after the all TBSs distributed at the first intervals from the maximum TBS are sorted in a value order, that is, largest or smallest N TBSs of the all TBSs distributed at the first intervals from the maximum TBS are served as the TBS supported by the data transmission. In an example in which the first TBS set is {328, 408, 504, 600, 712, 808, 936, 1000}, when the maximum TBS supported by the data transmission is 1000, and N=4, one TBS is taken every other TBS to obtain a following TBS set: {408, 600, 808, 1000}. Since a number of obtained TBSs is greater than or equal to 4, {408, 600, 808, 1000} is served as the TBS supported by the data transmission.

When the number of the all TBSs distributed at the first intervals from the maximum TBS among the TBSs less than or equal to the maximum TBS in the first TBS set is less than N, the all TBSs distributed at the first intervals from the maximum TBS among the TBSs less than or equal to the maximum TBS in the first TBS set are served as the TBS supported by the data transmission. In an embodiment, for example, N is 4. Of course, it is only an example, and N may have other values as needed. When the maximum TBS supported by the data transmission is 808, and N=4, one TBS is taken every other TBS to obtain following TBSs: {408, 600, 808}. Since only 3 TBSs are included, which is fewer than 4, {408, 600, 808} is served as the TBS supported by the data transmission. The first interval may be predefined or configured by the base station.

In an embodiment, the terminal determines the TBS supported by the data transmission according to a first rule which includes: the TBS supported by the data transmission is included in the first TBS set; indexes of the TBSs supported by the data transmission in the first TBS set are distributed at equal intervals; the TBS supported by the data transmission includes at least the maximum TBS supported by the data transmission; the TBS supported by the data transmission further includes a TBS with an index less than i, where i is an index of the maximum TBS supported by the data transmission in the first TBS set; and TBSs in the first TBS set are sorted in an ascending order.

In an embodiment, the first TBS set is divided into Q (Q is greater than or equal to 1) subsets in an ascending order of TBSs, and a number of resource units (RUs) corresponding to a TBS in each subset is defined or configured separately.

For example, Q−1 TBS thresholds may be configured to divide the first TBS set into Q subsets. For example, the first TBS set is {328, 408, 504, 600, 712, 808, 936, 1000}, when a TBS threshold is 600 bits, then TBSs less than or equal to 600 bits are divided into a first subset, and the number of RUs allocated for the first subset is selected from a set {3, 4, 5, 6, 8}; and TBSs greater than 600 bits are divided into a second subset, and the number of RUs allocated for the second subset is selected from a set {4, 5, 6, 8, 10}.

A value of the number of RUs (that is, a value in the set) is notified to the terminal through an RAR, where the RAR carries indication information of the number of RUs. The terminal acquires the indication information of the number of RUs from the RAR, determines a set of numbers of resource units corresponding to a subset to which the maximum TBS belongs, and determines a number of resource units corresponding to the maximum TBS according to the indication information of the number of RUs and the set of numbers of resource units corresponding to the maximum TBS.

Scheme three: According to the maximum TBS, corresponding TBSs supported by the data transmission are different and not in a set where the maximum TBS is located.

In an embodiment, the step in which the TBS supported by the data transmission is determined according to the maximum TBS supported by the data transmission includes steps described below. The first TBS set is divided into at least one subset each of which corresponds to one second TBS set; and a second TBS set corresponding to the maximum TBS is determined according to a subset to which the maximum TBS belongs; where the TBS supported by the data transmission includes the maximum TBS and a TBS in the second TBS set corresponding to the maximum TBS. That is, a correspondence between the at least one subset and the second TBS set is directly established, the second TBS set is determined by searching the correspondence, and then the TBS supported by the data transmission is determined.

In this embodiment, multiple subsets do not overlap with each other, and the multiple subsets are combined to constitute the first TBS set. In an extreme case, the first TBS set is divided into one subset, which is equivalent to no division. In another case, each TBS in the first TBS set is divided into one subset.

In an embodiment, the step in which the TBS supported by the data transmission is determined according to the maximum TBS supported by the data transmission includes steps described below. The first TBS set is divided into at least one subset, and each of the at least one subset corresponds to a number of TBSs; a number of TBSs corresponding to the maximum TBS is determined according to a subset to which the maximum TBS belongs; and a second TBS set is determined according to a preset rule, where a number of TBSs in the second TBS set is the same as the number of TBSs corresponding to the maximum TBS, and the TBS supported by the data transmission includes the maximum TBS and a TBS in the second TBS set.

In an embodiment, the step in which the second TBS set is determined according to the preset rule includes steps described below. A first resource number is determined, and M TBSs are selected from multiple TBSs corresponding to the first resource number in a correspondence table between a resource number and TBSs to constitute the second TBS set, where M is the same as the number of TBSs corresponding to the maximum TBS. In an embodiment, the correspondence table between the resource number and TBSs is shown as table 1.

TABLE 1

Correspondence table between the resource number and the TBSs

| | Number of RUs | | | | | | | |
|---|---|---|---|---|---|---|---|---|
| Index | 1 | 2 | 3 | 4 | 5 | 6 | 8 | 10 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

In an embodiment, the correspondence table between the resource number and TBSs may be pre-configured by the terminal or sent by the base station to the terminal. In an embodiment, a method for selecting the M TBSs from the multiple TBSs corresponding to the first resource number is, for example, when M=3, serving ¾, ½, and ¼ of the maximum TBS as 3 candidate TBSs, and selecting TBSs closest to the candidate TBSs from the multiple TBSs corresponding to the first resource number. In this embodiment, the selection method here is only an example, and other manners may be used as needed for selections.

In an embodiment, the step in which the first resource number is determined includes steps described below. The first resource number is acquired from the base station; or a correspondence between a subset and a number of resource units is acquired, and a number of resource units corresponding to the subset to which the maximum TBS belongs is served as the first resource number.

For example, ¾, ½, and ¼ of the maximum TBS are served as candidate TBSs, and TBSs, among TBSs corresponding to the number of RUs corresponding to the maximum TBS, which are closest to the candidate TBSs, are served as the TBSs in the second TBS set. For details, reference is made to the description in subsequent specific embodiments. In this embodiment, the rule here is only an example, and other rules may be set as needed.

In an embodiment, the TBS supported by the data transmission includes at least the maximum TBS supported by the data transmission; in addition to the maximum TBS, other TBSs among the TBSs supported by the data transmission are included in the second TBS set.

The number of TBSs in the second TBS set is determined by a following method: the first TBS set is divided into one or more subsets, each of which includes one or more TBSs, and a number of TBSs corresponding to each subset is defined or configured separately. A number of the TBS in the second TBS set may be determined according to the preset rule, and specific reference is made to the above-mentioned embodiments.

For example, the first TBS set is {328, 408, 504, 600, 712, 808, 936, 1000}, each TBS is defined as a subset, and the corresponding second TBS sets are shown in table 2.

TABLE 2

TBS sets (bits) available for an EDT

| Maximum TBS (Bits) | Second TBS Set |
|---|---|
| 1000 | 808, 600, 408 |
| 936 | 712, 504, 328 |
| 808 | 600, 408 |
| 712 | 504, 328 |
| 600 | 408, 328 |
| 504 | 328 |
| 408 | 328 |
| 328 | Null |

When the maximum TBS is 1000, the second TBS set is {808, 600, 408}, and finally the TBSs supported by the data transmission are {1000, 808, 600, 408}.

Scheme four: On the basis of scheme three, a minimum TBS is further configured by default.

In an embodiment, the step in which the TBS supported by the data transmission is determined according to the maximum TBS supported by the data transmission includes steps described below. The first TBS set is divided into one or more subsets each of which corresponds to one second TBS set; and a second TBS set corresponding to the maximum TBS is determined according to a subset to which the maximum TBS belongs; where the TBS supported by the data transmission includes the maximum TBS, a minimum TBS in the first TBS set, and a TBS in the second TBS set corresponding to the maximum TBS.

In an embodiment, the step in which the TBS supported by the data transmission is determined according to the maximum TBS supported by the data transmission includes steps described below. The first TBS set is divided into one or more subsets each of which corresponds to a number of TBSs; a number of TBSs corresponding to the maximum TBS is determined according to a subset to which the maximum TBS belongs; and a second TBS set is determined according to a preset rule, where a number of TBSs in the second TBS set is the same as the number of TBSs corresponding to the maximum TBS, and the TBS supported by the data transmission includes the maximum TBS, the minimum TBS in the first TBS set, and a TBS in the second TBS set.

In this embodiment, for the determination of the second TBS set, reference may be made to the above-mentioned embodiments and repetition is not made herein.

In an embodiment, the step in which the terminal determines the TBS supported by the data transmission according to the first rule includes: the TBS supported by the data transmission includes at least the maximum TBS supported by the data transmission; the TBS supported by the data transmission includes at least the minimum TBS in the first TBS set; in addition to the maximum TBS and the minimum TBS in the first TBS set, other TBSs (if present) among the TBSs supported by the data transmission are included in the second TBS set.

A number of TBSs in the second TBS set is determined by a following method: the first TBS set is divided into one or more subsets each of which includes one or more TBSs, and a number of TBSs in a second TBS set corresponding to each subset of the first TBS set is defined or configured separately. A number of TBSs in the second TBS set may be determined according to the preset rule.

In an embodiment, numbers of resource units (RUs) corresponding to different subsets of the first TBS set are defined or configured separately. The terminal determines a set of numbers of resource units corresponding to each subset according to predefined information or configuration information sent by the base station; and the terminal receives indication information of the number of resource units, and determines the number of resource units corresponding to the maximum TBS according to the indication information of the number of resource units and the set of numbers of resource units corresponding to the subset to which the maximum TBS belongs. In this embodiment, defined refers to predefined by the system or predefined by both of the terminal and the base station, and configured refers to configured by the base station side for the terminal.

In an embodiment, required numbers of times of repeated sending for the data transmission corresponding to different TBSs are defined or configured separately; and a required number of times of repeated sending for the data transmission corresponding to the TBS supported by the data transmission is determined according to the predefined information or the configuration information sent by the base station.

In an embodiment, the first TBS set is divided into at least one subset each of which corresponds to one TBS set, and the step in which the terminal determines the TBS supported by the data transmission according to the maximum TBS supported by the data transmission includes that the terminal determines the subset to which the maximum TBS supported by the data transmission belongs, and serves a TBS in a TBS set corresponding to the subset to which the maximum TBS supported by the data transmission belongs as the TBS supported by the data transmission. In an extreme case, each TBS in the first TBS set is divided into one subset. At this time, each TBS corresponds to one TBS set supported by the data transmission, and the TBS in the TBS set corresponding to the maximum TBS supported by the data transmission is directly served as the TBS supported by the data transmission. A correspondence table is directly established here, and the TBS supported by the data transmission may be acquired by looking up the table.

In an embodiment, the method further includes steps described below. The terminal selects a TBS from the TBS supported by the data transmission to perform the data transmission. The terminal detects downlink information sent by the base station, where the downlink information includes at least one of: indication information of whether the data transmission is successfully received, configuration information of a resource allocated for a case where re-sending of the data transmission is required, or configuration information of a resource allocated for a new data transmission of the terminal. The re-sending of the data transmission is required represents that the data transmission fails, and the resource needs to be allocated for a retransmission. The resource allocated for the new data transmission represents that the data transmission succeeds, and the new data transmission may be performed.

In an embodiment, the step in which the terminal detects the downlink information sent by the base station includes that the terminal detects the downlink information sent by the base station within a first time window, where the first time window is located after K times of repeated sending for the data transmission, and K is greater than or equal to 1. The K times of repeated sending may be K consecutive times of repeated sending (without an interval between every two times of sending), or may include that after k1 times of repeated sending, k2 times of repeated sending are continued after a period of stop time, k3 times of repeated sending are continued after a period of stop time, and so on to the end of kn times of repeated sending, where k1+k2+k3+ . . . +kn=K. That is, there are transmission intervals between each other. Multiple transmission intervals may be the same or different. The transmission intervals depend on resources configured for the data transmission. For example, for the resources configured for the data transmission, multiple resources are configured for the data transmission, one transmission interval is configured immediately after these multiple resources, and then further multiple resources are configured for the data transmission, and another one transmission interval is configured followed the multiple resources. For example, one transmission interval may be configured after 4 resources used for the data transmission, as shown by a transmission interval 1 in FIG. 2, another one transmission interval may be configured after 4 resources used for the data transmission, as shown by a transmission interval 2 in FIG. 2, and another one transmission interval may be configured after 8 resources used for the data transmission, as shown by a transmission interval 3 in FIG. 2. For another example, one transmission interval may be configured after 8 resources used for the data transmission, as shown by a transmission interval 4 in FIG. 3, another one transmission interval may be configured after 8 resources used for the data transmission, as shown by a transmission interval 5 in FIG. 3, and so on.

In an embodiment, that the first time window is located after the K times of repeated sending for the data transmission includes that the first time window is located within a transmission interval after the K times of repeated sending for the data transmission, and the terminal does not perform the data transmission within the transmission interval.

In an embodiment, there may be no transmission interval. The first time window is configured within resources used for the data transmission. For example, a time window for detecting downlink information is configured after 4 consecutive resources used for the data transmission (4 times of repeated sending), another time window for detecting the downlink information is configured after 8 consecutive resources used for the data transmission (8 times of repeated sending), another time window for detecting downlink information is configured after 16 consecutive resources used for the data transmission (16 times of repeated sending), and another time window for detecting downlink information is configured after 32 consecutive resources used for the data transmission (32 times of repeated sending).

In this embodiment, the first time window is configured by the base station for the terminal or predefined.

In an embodiment, K is a required number of times of repeated sending for the data transmission corresponding to the TBS selected by the terminal. For example, if the TBS selected by the terminal is 328, and the required number of times of repeated sending for the data transmission corresponding to TBS=328 is 4, the terminal may detect downlink data within a time interval after 4 times of the data transmission. For another example, if the TBS selected by the terminal is 328, and the required number of times of repeated sending for the data transmission corresponding to TBS=328 is 4, the terminal may detect the downlink data within a time window for detecting downlink information after 4 times of the data transmission.

Compared with that the terminal detects the downlink information only after a maximum number of times of repeated sending (a maximum number of times of repeated sending for all TBSs), the scheme provided by this embodiment may perform a detection in advance and end the data transmission if the TBS is relatively small, thereby reducing power consumption of the terminal.

In this embodiment, the terminal may continue the data transmission while detecting the downlink information within the first time window. Of course, in other embodiments, the data transmission may not be performed.

In an embodiment, the step in which the terminal detects a downlink message sent by the base station includes that the terminal detects the downlink message sent by the base station within a detection time window on a downlink control channel.

In an embodiment, in a case where indication information of an allocated TBS and indication information of an allocated resource are a preset combination in configuration information of the data transmission, the data transmission is an early data transmission (EDT). The preset combination may be predefined or configured by the base station.

In an embodiment, in a case where the EDT is sent through the Msg3, the configuration information is sent in the Msg2.

An embodiment of the present disclosure provides a transmission method including steps described below. A base station sends indication information of a maximum transmission block size (TBS) supported by a data transmission to a terminal. The base station determines a TBS supported by the data transmission of the terminal according to the maximum TBS supported by the data transmission.

In an embodiment, for a method for determining the TBS supported by the data transmission of the terminal according to the maximum TBS supported by the data transmission, reference may be made to the implementation on a terminal side and repetition is not made herein.

In an embodiment, the method further includes that the base station sends downlink information to the terminal, where the downlink information includes at least one of: indication information of whether the data transmission sent by the terminal is successfully received, configuration information of a resource allocated for a case where a re-sending of the data transmission is required, or configuration information of a resource allocated for a new data transmission of the terminal.

In an embodiment, the base station sends the downlink information within a first time window after the data transmission of the terminal is detected.

In an embodiment, the time window is located within a transmission interval, and the transmission interval is configured after K times of repeated sending for the data transmission, where K is a required number of times of repeated sending for the data transmission corresponding to the TBS supported by the data transmission. For example, the required number of times of repeated sending for the data transmission corresponding to TBS=328 is 4, then the transmission interval is configured after 4 times of repeated sending, as shown by the transmission interval 1 in FIG. 2; the required number of times of repeated sending for the data transmission corresponding to TBS=504 is 8, then the transmission interval is configured after 8 times of repeated sending (that is, 8 resources used for the data transmission), as shown by the transmission interval 2 in FIG. 2; the required number of times of repeated sending for the data transmission corresponding to TBS=712 is 16, then the transmission interval is configured after 16 times of repeated sending, as shown by the transmission interval 3 in FIG. 2; and the required number of times of repeated sending for the data transmission corresponding to TBS=1000 is 32, then the transmission interval is configured after 32 times of repeated sending (not shown in FIG. 2).

In an embodiment, the time window is configured after the K times of repeated sending for the data transmission. In this case, there may be no transmission interval. For example, the required number of times of repeated sending for the data transmission corresponding to TBS=328 is 4, then the time window is configured after 4 times of repeated sending, as shown by a time window t1 in FIG. 4; the required number of times of repeated sending for the data transmission corresponding to TBS=504 is 8, then the time window is configured after 8 times of repeated sending (that is, 8 resources used for the data transmission), as shown by a time window t2 in FIG. 4; the required number of times of repeated sending for the data transmission corresponding to TBS=712 is 16, then the time window is configured after 16 times of repeated sending, as shown by a time window t3 in FIG. 4; and the required number of times of repeated sending for the data transmission corresponding to TBS=1000 is 32, then the time window is configured after 32 times of repeated sending, as shown by a time window t4 in FIG. 4.

In an embodiment, the base station sends the downlink information on a downlink control channel.

The present disclosure is described below through specific examples. An EDT is used as an example of the data transmission in the embodiments described below for description, but the present disclosure is not limited thereto.

Specific Example One (Corresponding to Scheme One)

In this embodiment, a UE performs an uplink EDT through a Msg3.

A maximum TBS supported by the Msg3 used by a terminal for the EDT is selected from a first TBS set. In this embodiment, the first TBS set is {328, 408, 504, 600, 712, 808, 936, 1000}, and the TBS has the unit of bits.

A base station notifies the terminal through SI of an index of the maximum TBS supported by the Msg3 used for the EDT in the first TBS set. The terminal determines the maximum TBS according to the index.

In this embodiment, TBSs less than or equal to the maximum TBS are taken in order from the maximum TBS as TBSs supported by the EDT. In an embodiment, the TBSs supported by the EDT are determined according to a following rule: when a number of TBSs less than or equal to the maximum TBS in the first TBS set is greater than or equal to N, N TBSs less than or equal to the maximum TBS in the first TBS set are served as the TBSs supported by the EDT. For example, the TBSs less than or equal to the maximum TBS in the first TBS set are sorted, and first N TBSs or last N TBSs are taken as the TBSs supported by the EDT.

When the number of TBSs less than or equal to the maximum TBS in the first TBS set is less than or equal to N, the TBSs less than or equal to the maximum TBS in the first TBS set are served as the TBS supported by the EDT, where N is greater than or equal to 1.

A value of N may be pre-configured or sent by the base station to the terminal.

In this embodiment, if N equals 4 and the maximum TBS is 1000 bits, largest 4 TBSs less than or equal to 1000 are taken from the first TBS set {328, 408, 504, 600, 712, 808, 936, 1000} as the TBSs supported by the EDT, that is, a TBS set supported by the EDT is {1000, 936, 808, 712}.

If N equals 4 and the maximum TBS is 504, largest 3 TBSs less than or equal to 504 are taken from the first TBS set {328, 408, 504, 600, 712, 808, 936, 1000} as the TBSs supported by the EDT, that is, the TBS set supported by the EDT is {504, 408, 328}.

In another embodiment, a correspondence table between the maximum TBS and TBSs available for the EDT may be established. As shown in table 3, the terminal searches table 3 for the TBS set supported by the EDT according to the maximum TBS supported by the Msg3 used for the EDT and the value of N.

TABLE 3

| TBS set (bits) available for the EDT | | | | |
|---|---|---|---|---|
| Maximum TBS (Bits) | TBS Set (Bits) available for the EDT | | | |
| 1000 | 1000 | 936 | 808 | 712 |
| 936 | 936 | 808 | 712 | 600 |
| 808 | 808 | 712 | 600 | 504 |
| 712 | 712 | 600 | 504 | 408 |
| 600 | 600 | 504 | 408 | 328 |
| 504 | 504 | 408 | 328 | Null |
| 408 | 408 | 328 | Null | Null |
| 328 | 328 | Null | Null | Null |

In this embodiment, if the maximum TBS is 1000 bits and N equals 4, then the TBS set supported by the EDT is {1000, 936, 808, 712}. For another example, if the maximum TBS is 504 and N equals 4, the TBS set supported by the EDT is {504, 408, 328}.

In another embodiment, if the maximum TBS is 1000 bits and N equals 3, the TBS set supported by the EDT is {1000, 936, 808}.

Specific Example Two (Corresponding to Scheme Two)

In this embodiment, a maximum TBS supported by a Msg3 used by a terminal for an EDT is selected from a first TBS set. In this embodiment, the first TBS set is {328, 408, 504, 600, 712, 808, 936, 1000}, and the TBS has the unit of bits.

A base station notifies the terminal through SI of an index of the maximum TBS supported by the Msg3 used for the EDT in the first TBS set. The terminal determines the maximum TBS according to the index.

The terminal determines a TBS supported by the EDT according to a first rule which includes:

(1) The TBS supported by the EDT is included in the first TBS set.

(2) Indexes of TBSs supported by the EDT in the first TBS set are distributed at equal intervals.

(3) The TBS supported by the EDT includes at least the maximum TBS supported by the EDT.

(4) The TBS supported by the EDT further includes a TBS with an index less than i, where i is an index of the maximum TBS supported by the EDT in the first TBS set.

(5) TBSs in the first TBS set are sorted in an ascending order.

(6) When a number of TBSs determined according to (1) to (5) is greater than or equal to N, last N TBSs of the determined TBSs are selected from the determined TBSs (sorted in the ascending order) as the TBSs supported by the EDT. In this embodiment, N equals 4.

(7) When the number of TBSs supported by the EDT and determined according to (1) to (5) is less than N, the determined TBSs are used as the TBSs supported by the EDT.

In this embodiment, the first rule is converted into a formula as follows: the TBS supported by the EDT is a TBS with an index of j in the first TBS set, and j=i-Interval*p, where j is required to be an integer greater than or equal to 1 and less than or equal to 8.

In this embodiment, the TBSs in the first TBS set are sorted in the ascending order, and there are 8 TBSs in total. An index of a first TBS in the first TBS set is 1, and so on, an index of a last TBS is 8.

Interval is an interval between indexes and an integer greater than or equal to 1; p is an integer greater than or equal to 0; and i is the index of the maximum TBS supported by the EDT in the first TBS set.

When j determined according to the formula j=i-Interval*p and satisfying that "j is an integer greater than or equal to 1 and less than or equal to 8" form a set, and a number of elements in this set is greater than or equal to N, TBSs corresponding to largest N values of j in the set are selected to serve as the TBSs supported by the EDT.

When j determined according to the formula j=i-Interval*p and satisfying that "j is an integer greater than or equal to 1 and less than or equal to 8" form the set, and the number of elements in the set is less than N, TBSs corresponding to all values of j in the set are selected to serve as the TBSs supported by the EDT. In this embodiment, N equals 4.

In this embodiment, the interval (Interval) between indexes of the TBSs supported by the EDT in the first TBS set is 2; according to the first rule, a correspondence table of TBSs supported by the EDT corresponding to different maximum TBSs supported by the EDT is established. As shown in table 4, the TBS supported by the EDT may be determined by looking up the table. In this embodiment, establishing the correspondence table is only one implementation manner, and the TBS supported by the EDT may also be directly determined according to the first rule. Of course, the interval between indexes may also be 3 or the like.

In an example in which the maximum TBS is 1000, starting with 1000, one TBS is taken every two TBSs (that is, one TBS is taken every other TBS) from the first TBS set {328, 408, 504, 600, 712, 808, 936, 1000} as the TBS supported by the EDT, which obtains {408, 600, 808, 1000}.

TABLE 4

TBS set (bits) available for the EDT

| Maximum TBS (Bits) | TBS Set (Bits) available for the EDT | | | |
|---|---|---|---|---|
| 1000 | 1000 | 808 | 600 | 408 |
| 936 | 936 | 712 | 504 | 328 |
| 808 | 808 | 600 | 408 | Null |
| 712 | 712 | 504 | 328 | Null |
| 600 | 600 | 408 | Null | Null |
| 504 | 504 | 328 | Null | Null |
| 408 | 408 | Null | Null | Null |
| 328 | 328 | Null | Null | Null |

In this embodiment, if the maximum TBS is 1000 bits, it can be seen from table 4 that a TBS set supported by the EDT is {1000, 808, 600, 408}.

In this embodiment, the first TBS set is divided into two subsets. If a TBS threshold is configured to be 600 bits, TBSs less than or equal to 600 bits are divided into a first subset, that is, the first subset is {328, 408, 504, 600}, and a number of resource units (RUs) allocated for the first subset is selected from a set {3, 4, 5, 6, 8}, where a RU is a resource block composed by time domain and frequency domain.

TBSs greater than 600 bits are divided into a second subset, that is, the second subset is {712, 808, 936, 1000}, and a number of RUs allocated for the second subset is selected from a set {4, 5, 6, 8, 10}.

A specific value of the number of RUs is notified to the terminal in an RAR.

In this embodiment, the manner for sorting the TBSs in the first TBS set is not limited to the ascending order, and may also be a descending order.

In other embodiments, when the TBS supported by the data transmission is determined according to the maximum TBS, for part of maximum TBSs, the TBS supported by the data transmission may be determined according to the rule of specific example one, and for other maximum TBSs, the TBS supported by the data transmission may be determined according to the rule of specific example two. For example, when the maximum TBS is 1000 or 936, the TBS supported by the data transmission is obtained by looking up table 3, and when the maximum TBS is other values, the TBS supported by the data transmission is obtained by looking up table 4. First two rows of table 3 and last six rows of table 4 are combined into a new table as the TBS set available for the EDT. It is only an example here. It is also possible that for part of maximum TBSs, the TBS supported by the data transmission is determined according to the rule of scheme one, for part of maximum TBSs, the TBS supported by the data transmission is determined according to the rule of scheme two, for part of maximum TBSs, the TBS supported by the data transmission is determined according to the rule of scheme three, and for part of maximum TBSs, the TBS supported by the data transmission is determined according to the rule of scheme four, and so on.

Specific Example Three (Corresponding to Scheme Three)

In this embodiment, a maximum TBS supported by a Msg3 used by a terminal for an EDT is selected from a first TBS set, where the first TBS set is {328, 408, 504, 600, 712, 808, 936, 1000}, and the TBS has the unit of bits.

A base station notifies the terminal through SI of an index of the maximum TBS supported by the Msg3 used for the EDT in the first TBS set. The terminal determines the maximum TBS according to the index.

In this embodiment, the terminal determines a TBS supported by the EDT according to a first rule which includes that the TBS supported by the EDT includes at least the maximum TBS supported by the EDT; in addition to the maximum TBS, other TBSs among TBSs supported by the EDT are included in a second TBS set.

In this embodiment, the second TBS set is determined by a following method: according to the maximum TBS supported by the EDT (in this embodiment, the maximum TBS is 1000 bits and defined as TBS1), another three candidate TBSs are given, for example, TBS2=3/4*1000=750 bits, TBS3=2/4*1000=500 bits, and TBS4=1/4*1000=250 bits, separately.

TBSs closest to TBS2, TBS3, and TBS4 are found from a column corresponding to a determined number of RUs in table 5. In table 5, the number of RUs is a size of resources allocated by the base station for the terminal. Under a same number of RUs, the terminal may send data with multiple TBSs, where these multiple TBSs are distinguished with indexes of 0 to 13. When an index is determined, it represents that the terminal has selected a certain TBS for sending the data.

TABLE 5

Correspondence table between the number of RUs and TBSs

| | Number of RUs | | | | | | | |
|---|---|---|---|---|---|---|---|---|
| Index | 1 | 2 | 3 | 4 | 5 | 6 | 8 | 10 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

In this embodiment, when the number of RUs is 6, a TBS closest to TBS2=750 bits is 712 bits, corresponding to an index of 7 (which is the index in table 5); a TBS closest to TBS3=500 bits is 504 bits, corresponding to an index of 5; and a TBS closest to TBS4=250 bits is 256 bits, corresponding to an index of 2. Therefore, in this embodiment, the second TBS set is {712, 504, 256}.

Finally, a TBS set supported by the EDT is determined to be {1000, 712, 504, 256}.

Specific Example Four (Corresponding to Scheme Four)

In this embodiment, a maximum TBS supported by a Msg3 used by a terminal for an EDT is selected from a first TBS set, where the first TBS set is {328, 408, 504, 600, 712, 808, 936, 1000}, and the TBS has the unit of bits.

A base station notifies the terminal through SI of an index of the maximum TBS supported by the Msg3 used for the EDT in the first TBS set. The terminal searches the first TBS set according to the index to determine the maximum TBS supported by the EDT.

In this embodiment, the terminal determines a TBS supported by the EDT according to a first rule which includes that the TBS supported by the EDT includes at least the maximum TBS supported by the EDT; in addition to the maximum TBS, other TBSs among TBSs supported by the EDT are included in a second TBS set.

The second TBS set is determined by a following method: according to the maximum TBS supported by the EDT (in this embodiment, the maximum TBS is 600 bits and defined as a TBS1), other three candidate TBSs are given, for example, $$TBS2 = \left\lfloor \frac{3}{4} \times 600 \right\rfloor = 375 \text{ bits},$$

$$TBS3 = \left\lfloor \frac{2}{4} \times 600 \right\rfloor = 250 \text{ bits, and } TBS4 = \left\lfloor \frac{1}{4} \times 600 \right\rfloor = 125 \text{ bits},$$

separately. In this embodiment, it is only an example here, and other manners for determining candidate TBSs may be set as needed.

TBSs closest to TBS2, TBS3, and TBS4 are found from a column corresponding to a determined number of RUs in table 5.

In this embodiment, when the number of RUs is 4, a TBS closest to TBS2=375 bits is 392 bits, corresponding to an index of 6; a TBS closest to TBS3=250 bits is 256 bits, corresponding to an index of 4; and a TBS closest to TBS4=125 bits is 144 bits, corresponding to an index of 2.

In this embodiment, the TBS supported by the EDT is required to be greater than or equal to 250 bits (this is a predefined rule in this embodiment, and other rules may be set as needed), and then the second TBS set is {392, 256}.

Finally, a TBS set supported by the EDT is determined to be {600, 392, 256}.

Specific Example Five (Corresponding to Scheme Three)

A maximum TBS supported by a Msg3 used by a terminal for an EDT is selected from a first TBS set, where the first TBS set is {328, 408, 504, 600, 712, 808, 936, 1000}, and the TBS has a unit of bits.

A base station notifies the terminal through SI of an index of the maximum TBS supported by the Msg3 used for the EDT in the first TBS set. The terminal determines the maximum TBS supported by the EDT according to the index.

In this embodiment, the terminal determines a TBS supported by the EDT according to a first rule which includes that the TBS supported by the EDT includes at least the maximum TBS supported by the EDT; in addition to the maximum TBS, other TBSs among TBSs supported by the EDT are included in a second TBS set.

The second TBS set is determined by a following method: according to the maximum TBS supported by the EDT (in this embodiment, the maximum TBS is 712 bits and defined as TBS1), another two candidate TBSs are determined, for example, $$TBS2 = \left\lfloor \frac{3}{4} \times 712 \right\rfloor = 534 \text{ bits, and } TBS3 = \left\lfloor \frac{2}{4} \times 712 \right\rfloor = 356 \text{ bits},$$

separately. In this embodiment, it is only an example here, and manners for determining candidate TBSs may be set as needed.

TBSs closest to TBS2 and TBS3 are found from a preset row in table 5. In this embodiment, the preset row is the row where TBS1 is located. In this embodiment, a number of RUs allocated for TBS1 is 6, a column corresponding to RU=6 is searched to obtain that the row where TBS1 is located is a row with an index of 7, and the preset row is the row with an index of 7. In this embodiment, the number of RUs is required to be greater than or equal to 3 (it is a predefined rule here, and other rules may be set as needed). Therefore, in the row with the index of 7, a TBS closest to TBS2=534 bits is 584 bits, and the corresponding {number of RUs, index} is {5, 7}; and a TBS closest to TBS3=356 bits is 328 bits, and the corresponding {number of RUs, index} is {3, 7}.

In this embodiment, the TBS supported by the EDT is required to be greater than or equal to 320 bits (it is a predefined rule here, and other rules may be set as needed), and then the second TBS set is {584, 328}.

Finally, a TBS set supported by the EDT is determined to be {712, 584, 328} and the corresponding number of RUs is {7, 5, 3}.

Specific Example Six (Corresponding to Scheme Four)

In this embodiment, a maximum TBS supported by a Msg3 used by a terminal for an EDT is selected from a first TBS set, where the first TBS set is {328, 408, 504, 600, 712, 808, 936, 1000}, and the TBS has a unit of bits.

A base station notifies the terminal through SI of an index of the maximum TBS supported by the Msg3 used for the EDT in the first TBS set. The terminal determines the maximum TBS supported by the EDT according to the index.

In this embodiment, the terminal determines a TBS supported by the EDT according to a first rule which includes: the TBS supported by the EDT includes at least the maximum TBS supported by the EDT; the TBS supported by the EDT includes at least a minimum TBS in the first TBS set; in addition to the maximum TBS and the minimum TBS in the first TBS set, other TBSs (if present) among TBSs supported by the EDT are included in a second TBS set.

The second TBS set is determined by a following method: according to the maximum TBS supported by the EDT (in this embodiment, the maximum TBS is 1000 bits and defined as TBS1), other two candidate TBSs are determined, for example, TBS2=3/4*1000=750 bits, and TBS3=2/4*1000=500 bits, separately. In this embodiment, it is only an example here, and a manner for determining candidate TBSs may be set as needed.

TBSs closest to TBS2 and TBS3 are found from a column corresponding to a determined number of RUs in table 5.

In this embodiment, when the number of RUs is 6, a TBS closest to TBS2=750 bits is 712 bits, corresponding to an index of 7; and a TBS closest to TBS3=500 bits is 504 bits, corresponding to an index of 5.

Therefore, in this embodiment, the second TBS set is {712, 504}.

Finally, a TBS set supported by the EDT is determined to be {1000, 712, 504, 328}.

Specific Example Seven

In this embodiment, a TBS set supported by a Msg3 used by a terminal for an EDT is {1000, 712, 504, 328}. A number of RUs configured by a base station for the EDT is 6. A number of times of repeated sending for the EDT corresponding to TBS=1000 is 32, a number of times of repeated sending for the EDT corresponding to TBS=712 is 16, a number of times of repeated sending for the EDT corresponding to TBS=504 is 8, and a number of times of repeated sending for the EDT corresponding to TBS=328 is 4.

Figure 2:
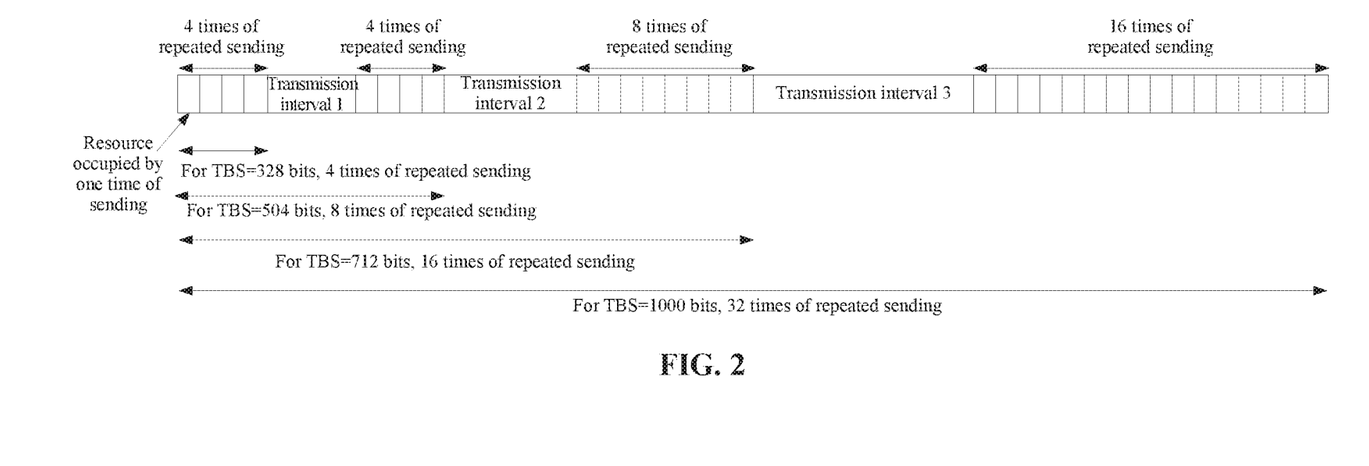
FIG. 2 is a schematic diagram of resources for sending an EDT according to an embodiment of the present disclosure.

A schematic diagram of resources configured by the base station for the EDT is shown in FIG. 2. One transmission interval is separately inserted after each of the numbers of times of repeated sending corresponding to TBS=328, TBS=504, and TBS=712 ends, and these transmission intervals are separately defined as a transmission interval 1, a transmission interval 2, and a transmission interval 3.

The base station configures a time window for detecting downlink information separately within the transmission interval 1, the transmission interval 2, and the transmission interval 3 to indicate whether the EDT of the terminal is successfully received. In this embodiment, the transmission interval 1 is for an EDT with TBS=328, that is, when selecting TBS=328 for a data transmission, the terminal detects the downlink information in the transmission interval 1; the transmission interval 2 is for an EDT with TBS=504, that is, when TBS=504 is selected for the data transmission, the downlink information is detected in the transmission interval 2; and the transmission interval 3 is for an EDT with TBS=712, that is, when TBS=712 is selected for the data transmission, the downlink information is detected in the transmission interval 3. Lengths of the transmission interval 1, the transmission interval 2, and the transmission interval 3 may be independently or uniformly configured, and may be the same as or different from one another.

If the EDT performed by the terminal corresponds to TBS=1000 bits, after 32 times of repeated sending are completed, the base station will send the downlink information within the time window to indicate whether the EDT of the terminal is successfully received.

In this embodiment, the downlink information is sent on a downlink control channel.

In this embodiment, the terminal does not perform the EDT within time periods corresponding to the transmission interval 1, the transmission interval 2, and the transmission interval 3.

Specific Example Eight

In this embodiment, a TBS set supported by a Msg3 used by a terminal for an EDT is {1000, 712, 504, 328}. A number of RUs configured by a base station for the EDT is 6. A number of times of repeated sending for the EDT corresponding to TBS=1000 is 32, a number of times of repeated sending for the EDT corresponding to TBS=712 is 16, a number of times of repeated sending for the EDT corresponding to TBS=504 is 8, and a number of times of repeated sending for the EDT corresponding to TBS=328 is 8.

Figure 3:
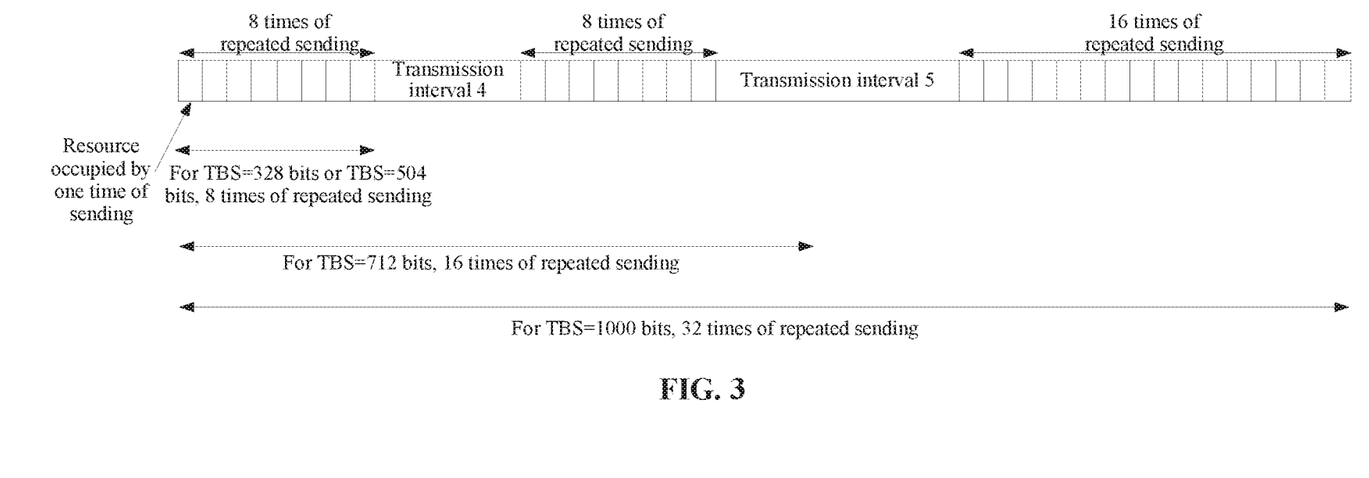
FIG. 3 is another schematic diagram of resources for sending an EDT according to an embodiment of the present disclosure.

A schematic diagram of resources configured by the base station for the EDT is shown in FIG. 3. One transmission interval is separately inserted after each of the numbers of times of repeated sending corresponding to TBS=328, TBS=504, and TBS=712 ends, and these transmission intervals are separately defined as a transmission interval 4 and a transmission interval 5.

The base station configures a time window for detecting downlink information separately within the transmission interval 4 and the transmission interval 5 to indicate whether the EDT of the terminal is successfully received. In this embodiment, the transmission interval 4 is for EDTs with TBS=328 and TBS=504, and the transmission interval 5 is for an EDT with TBS=712.

If the EDT performed by the terminal corresponds to TBS=1000 bits, after 32 times of repeated sending are completed, the base station will send the downlink information within the time window to indicate whether the EDT of the terminal is successfully received.

In this embodiment, the downlink information is sent on a downlink control channel.

In this embodiment, the terminal does not perform the EDT within time periods corresponding to the transmission interval 4 and the transmission interval 5.

Specific Example Nine

In this embodiment, a TBS set supported by a Msg3 used by a terminal for an EDT is {1000, 712, 504, 328}. A number of RUs configured by a base station for the EDT is 6. A number of times of repeated sending for the EDT corresponding to TBS=1000 is 32, a number of times of repeated sending for the EDT corresponding to TBS=712 is 16, a number of times of repeated sending for the EDT corresponding to TBS=504 is 8, and a number of times of repeated sending for the EDT corresponding to TBS=328 is 4.

Figure 4:
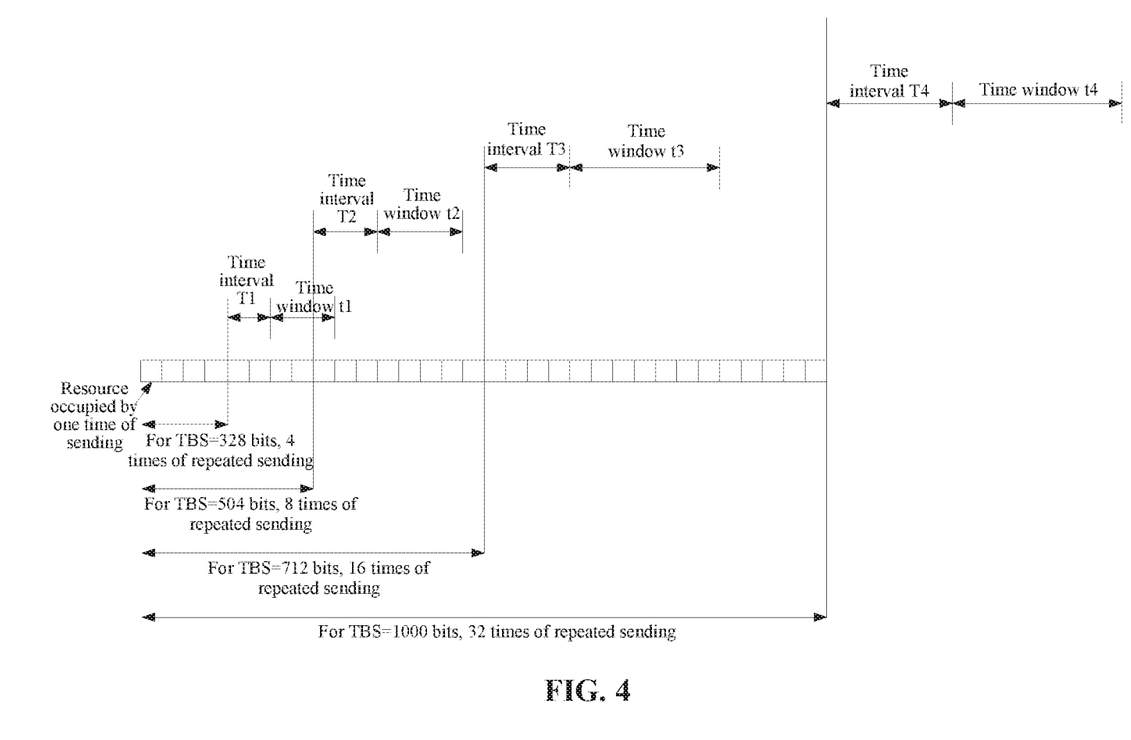
FIG. 4 is another schematic diagram of resources for sending an EDT according to an embodiment of the present disclosure.

A schematic diagram of resources configured by the base station for the EDT is shown in FIG. 4. One time window for detecting downlink information is separately configured after each of the numbers of times of repeated sending corresponding to TBS=328, TBS=504, TBS=712, and TBS=1000 ends, where the downlink information is used for indicating whether the EDT of the terminal is successfully received. Those time windows are separately defined as a time window t1, a time window t2, a time window t3, and a time window t4. In this embodiment, a time interval T1 (T1 is greater than or equal to 0) exists between a starting moment of the time window t1 and an ending moment of the number of times of repeated sending corresponding to TBS=328. A time interval T2 (T2 is greater than or equal to 0) exists between a starting moment of the time window t2 and an ending moment of the number of times of repeated sending corresponding to TBS=504. A time interval T3 (T3 is greater than or equal to 0) exists between a starting moment of the time window t3 and an ending moment of the number of times of repeated sending corresponding to TBS=712. A time interval T4 (T4 is greater than or equal to 0) exists between a starting moment of the time window t4 and an ending moment of the number of times of repeated sending corresponding to TBS=1000.

The base station configures the time window for detecting downlink information separately within the time window t1, the time window t2, the time window t3, and the time window t4 to indicate whether the EDT of the terminal is successfully received. In this embodiment, the time window t1 is for an EDT with TBS=328, that is, when selecting TBS=328 for a data transmission, the terminal detects the downlink information within the time window t1, the time window t2 is for an EDT with TBS=504, the time window t3 is for an EDT with TBS=712, and the time window t4 is for an EDT with TBS=1000. Lengths of the time window t1, the time window t2, the time window t3, and the time window t4 may be independently or uniformly configured. Multiple time windows may have a same size or different sizes.

In this embodiment, the downlink information is sent on a downlink control channel.

In this embodiment, the terminal continues sending the EDT while detecting the downlink information within the time window.

Specific Example Ten

In this embodiment, a TBS set supported by a Msg3 used by a terminal for an EDT is {1000, 712, 504, 328}. A number of RUs configured by a base station for the EDT is 6. A number of times of repeated sending for the EDT corresponding to TBS=1000 is 32, a number of times of repeated sending for the EDT corresponding to TBS=712 is 16, a number of times of repeated sending for the EDT corresponding to TBS=504 is 8, and a number of times of repeated sending for the EDT corresponding to TBS=328 is 4.

A schematic diagram of resources configured by the base station for the EDT is shown in FIG. 4. Multiple time windows for detecting downlink information are configured, where the downlink information is used for indicating whether the EDT of the terminal is successfully received. Those time windows are separately defined as a time window t1, a time window t2, time window t3, and a time window t4. The multiple time windows may have a same size or different sizes. In this embodiment, a time interval T1 (T1 is greater than or equal to 0) exists between a starting moment of the time window t1 and an ending moment of the number of times of repeated sending corresponding to TBS=328. A time interval T2 (T2 is greater than or equal to 0) exists between a starting moment of the time window t2 and an ending moment of the number of times of repeated sending corresponding to TBS=504. A time interval T3 (T3 is greater than or equal to 0) exists between a starting moment of the time window t3 and an ending moment of the number of times of repeated sending corresponding to TBS=712. A time interval T4 (T4 is greater than or equal to 0) exists between a starting moment of the time window t4 and an ending moment of the number of times of repeated sending corresponding to TBS=1000. Multiple time intervals may have a same size or different sizes.

In this embodiment, no resource for sending the downlink information is configured within the time window t1, and the base station configures resources for sending the downlink information separately within the time window t2, the time window t3, and the time window t4 to indicate whether the EDT of the terminal is successfully received. In this embodiment, when selecting TBS=328 or 504 for a data transmission, the terminal detects the downlink information within the time window t2; when selecting TBS=712 for the data transmission, the terminal detects the downlink information within the time window t3; and when selecting TBS=1000 for the data transmission, the terminal detects the downlink information within the time window t4.

If the EDT of a UE corresponds to TBS=328, the UE does not detect the downlink information after 4 times of repeated sending of the EDT are completed, continues the EDT until 8 times of repeated sending in total are completed (the number of times of repeated sending corresponding to TBS=504 is reached), and then detects the downlink information within the time window t2.

In this embodiment, the downlink information is sent on a downlink control channel.

In this embodiment, the terminal continues sending of the EDT while detecting the downlink information within the time window.

Specific Example Eleven

In this embodiment, configuration information of a Msg3 is sent in a Msg2, where a value of a TBS for the Msg3 is determined according to table 6. In table 6, $I_{TBS}$ is an index of an allocated TBS, and $N_{PRB}$ is a number of allocated physical resource blocks (PRBs). A preset combination is {0,6}, and then when {$I_{TBS}$, $N_{PRB}$}={0.6}, an EDT is performed through the Msg3. For other combinations of {$I_{TBS}$, $N_{PRB}$} the Msg3 is not used for the EDT and is used for sending a collision detection message to solve the problem of collisions in a random access process.

TABLE 6

| | TBS configuration information | |
|---|---|---|
| | $N_{PRB}$ | |
| $I_{TBS}$ | 3 | 6 |
| 0 | 56 | 152 |
| 1 | 88 | 208 |
| 2 | 144 | 256 |
| 3 | 176 | 328 |

Figure 5:
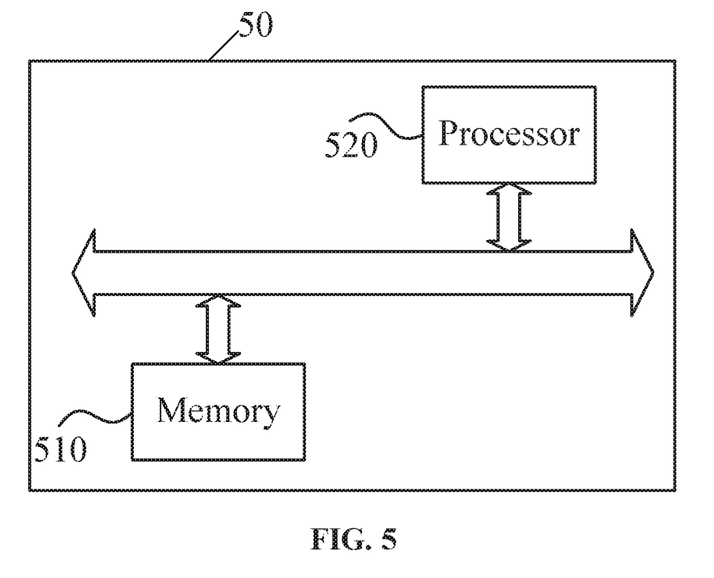
FIG. 5 is a block diagram of a transmission device according to an embodiment of the present disclosure.

As shown in FIG. 5, an embodiment of the present disclosure provides a transmission device 50. The transmission device 50 includes a memory 510 and a processor 520, where the memory 510 stores a program which, when read and executed by the processor 520, implements the transmission method according to any one of the embodiments.

An embodiment of the present disclosure provides a computer readable storage medium. The computer readable storage medium stores at least one program executable by at least one processor to implement the transmission method according to any one of the embodiments.

The computer readable storage medium includes at least one medium capable of storing program codes, such as a universal serial bus (USB) flash disk, a read-only memory (ROM), a random access memory (RAM), a mobile hard disk, a magnetic disk, or an optical disk.

What is claimed is:
1. A method, comprising:
receiving, by a terminal, an indication of a maximum transmission block size (TBS) supported by a data transmission;
determining, by the terminal, the maximum TBS according to the indication;
determining, by the terminal, a TBS supported by the data transmission according to the maximum TBS, wherein determining the TBS comprises: in a case where a number of TBSs less than or equal to the maximum TBS in a TBS set is greater than or equal to N, serving N TBSs of the TBSs less than or equal to the maximum

TBS in the TBS set as the TBS supported by the data transmission, wherein N is greater than or equal to 1;
receiving, by the terminal, indication information; and
determining, by the terminal, a number of resource units corresponding to the maximum TBS, according to the indication information and a subset to which the maximum TBS belongs, wherein the subset is one of a plurality of subsets of the TBS set, each of the subsets corresponding to a respective set of numbers of resource units,
wherein the TBS set includes a set of maximum TBSs comprising 1000 bits, 936 bits, 808 bits, 504 bits, 408 bits and 328 bits.

2. The method of claim 1, comprising:
determining, by the terminal, the maximum TBS from the TBS set according to index information, wherein the indication comprises the index information.

3. A non-transitory computer readable medium storing instructions, which when executed by at least one processor, cause the at least one processor to perform the method of claim 2.

4. The method of claim 1, wherein the maximum TBS comprises 1000 bits, 936 bits, 808 bits, 504 bits, 408 bits or 328 bits.

5. A non-transitory computer readable medium storing instructions, which when executed by at least one processor, cause the at least one processor to perform the method of claim 1.

6. A method, comprising:
receiving, by a terminal, an indication of a maximum transmission block size (TBS) supported by a data transmission;
determining, by the terminal, the maximum TBS according to the indication;
determining, by the terminal, a TBS supported by the data transmission according to the maximum TBS, wherein determining the TBS comprises in a case where a number of TBSs less than or equal to the maximum TBS in a TBS set is less than N, serving the TBSs less than or equal to the maximum TBS in the TBS set as the TBS supported by the data transmission, wherein N is greater than or equal to 1;
receiving, by the terminal, indication information; and
determining, by the terminal, a number of resource units corresponding to the maximum TBS, according to the indication information and a subset to which the maximum TBS belongs, wherein the subset is one of a plurality of subsets of the TBS set, each of the subsets corresponding to a respective set of numbers of resource units,
wherein the TBS set includes a set of maximum TBSs comprising 1000 bits, 936 bits, 808 bits, 504 bits, 408 bits and 328 bits.

7. The method of claim 1, wherein determining the TBS comprises:
sorting TBSs in the TBS set in order, and serving all TBSs distributed at first intervals from a maximum TBS of TBSs less than or equal to the maximum TBS in the TBS set or a subset of the all TBSs distributed at the first intervals as the TBS supported by the data transmission.

8. A non-transitory computer readable medium storing instructions, which when executed by at least one processor, cause the at least one processor to perform the method of claim 7.

9. The method of claim 1, wherein the indication information comprises indication information of the number of resource units.

10. A non-transitory computer readable medium storing instructions, which when executed by at least one processor, cause the at least one processor to perform the method of claim 6.

11. A device, comprising:
at least one processor configured to:
receive an indication of a maximum transmission block size (TBS) supported by a data transmission;
determine the maximum TBS according to the indication;
determine a TBS supported by the data transmission according to the maximum TBS, wherein the at least one processor is configured to determine the TBS by, in a case where a number of TBSs less than or equal to the maximum TBS in a TBS set is greater than or equal to N, serving N TBSs of the TBSs less than or equal to the maximum TBS in the TBS set as the TBS supported by the data transmission, wherein N is greater than or equal to 1;
receive indication information; and
determine number of resource units corresponding to the maximum TBS, according to the indication information and a subset to which the maximum TBS belongs, wherein the subset is one of a plurality of subsets of the TBS set, each of the subsets corresponding to a respective set of numbers of resource units,
wherein the TBS set includes a set of maximum TBSs comprising 1000 bits, 936 bits, 808 bits, 504 bits, 408 bits and 328 bits.

12. The device of claim 11, wherein the at least one processor is configured to:
determine the maximum TBS from the TBS set according to index information, wherein the indication comprises the index information.

13. The device of claim 11, wherein the maximum TBS comprises 1000 bits, 936 bits, 808 bits, 504 bits, 408 bits or 328 bits.

14. The device claim 11, wherein the at least one processor is configured to determine the TBS by:
sorting TBSs in the TBS set in order, and serving all TBSs distributed at first intervals from a maximum TBS of TBSs less than or equal to the maximum TBS in the TBS set or a subset of the all TBSs distributed at the first intervals as the TBS supported by the data transmission.

15. The device of claim 11, wherein the indication information comprises indication information of the number of resource units.

16. A device, comprising:
at least one processor configured to:
receive an indication of a maximum transmission block size (TBS) supported by a data transmission;
determine the maximum TBS according to the indication;
determine a TBS supported by the data transmission according to the maximum TBS, wherein the at least one processor is configured to determine the TBS by, in a case where a number of TBSs less than or equal to the maximum TBS in a TBS set is less than N, serving the TBSs less than or equal to the maximum TBS in the TBS set as the TBS supported by the data transmission, wherein N is greater than or equal to 1;

receive indication information; and determine number of resource units corresponding to the maximum TBS, according to the indication information and a subset to which the maximum TBS belongs, wherein the subset is one of a plurality of subsets of the TBS set, each of the subsets corresponding to a respective set of numbers of resource units, wherein the TBS set includes a set of maximum TBSs comprising 1000 bits, 936 bits, 808 bits, 504 bits, 408 bits and 328 bits.

* * * * *

UNITED STATES PATENT AND TRADEMARK OFFICE
CERTIFICATE OF CORRECTION

PATENT NO. : 11,388,711 B2
APPLICATION NO. : 17/022689
DATED : July 12, 2022
INVENTOR(S) : Kun Liu et al.

Page 1 of 1

It is certified that error appears in the above-identified patent and that said Letters Patent is hereby corrected as shown below:

In the Claims

In Claim 1, Column 22, Line 67, please delete "N TBSs of"

In Claim 11, Column 24, Line 20, please delete "N TBSs of"

In Claim 11, Column 24, Line 25, please insert "a" between "determine" and "number"

In Claim 16, Column 25, Line 4, please insert "a" between "determine" and "number"

Signed and Sealed this
Second Day of January, 2024

Katherine Kelly Vidal
*Director of the United States Patent and Trademark Office*